US007813751B2

(12) United States Patent
Mizuguchi

(10) Patent No.: US 7,813,751 B2
(45) Date of Patent: Oct. 12, 2010

(54) TRANSMISSION POWER CONTROL SYSTEM AND METHOD CAPABLE OF SAVING BATTERY CONSUMPTION OF MOBILE STATION AND PREVENTING CONNECTION CAPACITY FROM BEING REDUCED

(75) Inventor: Hironori Mizuguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1561 days.

(21) Appl. No.: 09/924,723

(22) Filed: Aug. 9, 2001

(65) Prior Publication Data

US 2002/0018516 A1  Feb. 14, 2002

(30) Foreign Application Priority Data

Aug. 9, 2000  (JP)  ............................. 2000-240547

(51) Int. Cl.
  *H04W 74/00*  (2009.01)
(52) U.S. Cl. ........................ 455/522; 455/69; 455/574; 375/130
(58) Field of Classification Search ................ 455/522, 455/574, 13.4, 69, 17, 23, 42, 44, 61, 102, 455/108, 110, 126, 205, 295; 375/130; 370/318, 370/329, 252
  See application file for complete search history.

(56) References Cited

U.S. PATENT DOCUMENTS

| 36,056 | A | * | 7/1862 | Nonami ...................... 144/156 |
| 5,333,175 | A | | 7/1994 | Ariyavisitakul et al. |
| 5,386,589 | A | * | 1/1995 | Kanai .......................... 455/423 |
| 5,697,064 | A | * | 12/1997 | Okamoto et al. ............. 455/507 |
| 5,812,938 | A | * | 9/1998 | Gilhousen et al. ............. 455/69 |
| 5,822,318 | A | * | 10/1998 | Tiedemann et al. ......... 370/391 |
| 5,859,874 | A | * | 1/1999 | Wiedeman et al. .......... 375/267 |
| 5,924,043 | A | | 7/1999 | Takano |
| 5,960,330 | A | * | 9/1999 | Azuma ......................... 455/70 |
| 6,038,220 | A | * | 3/2000 | Kang et al. .................. 370/252 |
| 6,151,508 | A | | 11/2000 | Kim et al. |
| 6,256,476 | B1 | * | 7/2001 | Beamish et al. ............. 340/7.36 |
| 6,341,214 | B2 | * | 1/2002 | Uesugi .......................... 455/69 |
| 6,385,183 | B1 | * | 5/2002 | Takeo .......................... 370/335 |
| 6,418,321 | B1 | * | 7/2002 | Itoh ............................. 455/522 |

(Continued)

FOREIGN PATENT DOCUMENTS

CN  1185706 A  6/1998

(Continued)

OTHER PUBLICATIONS

Article "Soft Dropping Power Control"; Authors: Roy D. Yates, et al.; vol. 3, pp. 1694-1698-published May 4, 1997.

*Primary Examiner*—Matthew D Anderson
*Assistant Examiner*—Shaima Q Aminzay
(74) *Attorney, Agent, or Firm*—Sughrue Mion, PLLC

(57) ABSTRACT

A transmission power control system comprises a communication state monitor circuit and a transmission power control bit adjusting circuit connected to the communication state monitor circuit. The communication state monitor circuit detects quality deterioration of a communication state of radio communication between a base station and mobile stations. The transmission power control bit adjusting circuit adjusts the transmission power control bit signals so as to suppress increase of transmission power of the mobile stations when the quality deterioration detector detects the quality deterioration.

42 Claims, 14 Drawing Sheets

U.S. PATENT DOCUMENTS

| | | | |
|---|---|---|---|
| 6,487,174 B1 * | 11/2002 | Mizuguchi et al. | 370/252 |
| 6,539,008 B1 * | 3/2003 | Ahn et al. | 370/342 |
| 6,603,746 B1 * | 8/2003 | Larijani et al. | 370/318 |
| 6,603,980 B1 * | 8/2003 | Kitagawa et al. | 455/522 |
| 6,633,552 B1 * | 10/2003 | Ling et al. | 370/318 |
| 6,697,343 B1 * | 2/2004 | Kamel et al. | 370/311 |
| 6,717,976 B1 * | 4/2004 | Shen | 375/147 |
| 6,956,840 B1 * | 10/2005 | Proctor, Jr. | 370/342 |
| 2001/0014612 A1 * | 8/2001 | Uesugi | 455/522 |
| 2002/0151323 A1 * | 10/2002 | Bender et al. | 455/522 |

FOREIGN PATENT DOCUMENTS

| | | |
|---|---|---|
| EP | 0-682419 A2 | 11/1995 |
| EP | 0762668 A2 | 12/1997 |
| JP | 08-32515 | 2/1996 |
| JP | 9-36801 | 7/1997 |
| JP | 10-247894 | 9/1998 |
| JP | 11-275035 A | 10/1999 |
| JP | 11-340947 | 10/1999 |
| JP | 2000-102052 | 7/2000 |
| KR | 2000-0019789 A | 4/2000 |
| KR | 2000-0022672 A | 4/2000 |
| WO | WO 99/20005 A2 | 4/1999 |

* cited by examiner

TRANSMISSION POWER CONTROL SYSTEM AND METHOD CAPABLE OF SAVING BATTERY CONSUMPTION OF MOBILE STATION AND PREVENTING CONNECTION CAPACITY FROM BEING REDUCED

BACKGROUND OF THE INVENTION

This invention relates to a transmission power control system and method for use in a digital mobile communication system, in particular to a reverse-link transmission power control system of the digital mobile communication system to control reverse-link transmission power.

In the digital mobile communication system, the reverse-link (or up-link) transmission power is generally controlled to save battery consumption of mobile stations with keeping a desired receiving quality at a base station which communicate with the mobile stations and to control interference between transmission signals transmitted from the mobile stations. Especially, such transmission power control is indispensable for the code division multiple access (CDMA) system because the mobile stations simultaneously uses a common frequency band in the CDMA system. The common frequency band is also used in other cells adjoining the cell covered by the base station in the CDMA system.

A conventional transmission power control system includes a part provided in the base station and other parts provided in the base stations.

The base station has a plurality of receivers for receiving reverse-link (or up-link) transmission signals transmitted from the mobile terminals. IF the number of the receivers is N (N: a natural number), the base station can receive N of the reverse-link transmission signals. When each of the receivers receives the reverse-link transmission signal transmitted from a certain one of the mobile terminals, it demodulates the reverse-link transmission signal to produce a demodulated signal.

The transmission power control system comprises signal-to-noise ratio (SNR) determining circuits connected to the receivers respectively in the base station. Each of the signal-to-noise ratio determining circuits determines a signal-to-noise ratio of the demodulated signal supplied from the receiver connected thereto. Herein the noise of the demodulated signal includes not only thermal noise but also interference. Accordingly, the signal-to-noise ratio is also called a signal-to-interference ratio (SIR) when attention is paid to the interference. Transmission power control (TPC) bit generators are connected to the SNR determining circuits respectively.

Each of the TPC bit generators generates a transmission power control (TPC) bit signal in response to the SNR determined by the SNR determining circuit connected thereto. The TPC bit signal is used to require the corresponding mobile station to increase of the transmission power when the SNR is smaller than a predetermined threshold. On the contrary, the TPC bit signal is used to require the corresponding mobile station to decrease of the transmission power when the SNR is larger than the predetermined threshold.

The base station multiplexes the TPC bit signal and a forward-link (or down-link) information signal for the corresponding mobile station to the corresponding mobile station.

When the corresponding mobile station receives the TPC bit signal and the forward-link information signal for the corresponding mobile station, it controls the transmission power in response to the TPC bit signal transmitted from the base station together with the forward-link information signal for the corresponding mobile station.

Thus, the transmission power of each mobile station is controlled so that the corresponding SNR at the base station becomes larger than a desired SNR and the transmission power becomes as small as possible.

Such a transmission power control system is disclosed in Japanese Unexamined Patent Publication (JP-A) No. 8-32515.

As mentioned above, the mobile stations use the common frequency band to communicate with the base station in the CDMA system. In addition, the common frequency band is also used in other cells adjoining the cell covered by the base station in the CDMA system. Thus, increase of the mobile stations simultaneously using the common frequency band brings increase in interference between the transmission signals used in the CDMA system. When the interference becomes large, the conventional transmission power control system goes on repeating that it produces the transmission power control bit signals which require the corresponding mobile stations to increase the transmission power. As a result, a large number of the mobile stations using the common frequency band transmit the transmission signals with the maximum transmission power. Accordingly, the interference is not suppressed, rather, becomes larger. In this situation, each of the mobile stations wastes electricity of a battery on trying to improve the SNR at the base station. In addition, the maximum number of the mobile stations, which can simultaneously use in the mobile communication system, becomes small because of the interference between the cells. In other words, a connection capacity of the mobile communication system becomes small because of the interference between the cells.

SUMMARY OF THE INVENTION

It is therefore an object of this invention to provide a transmission power control system which is capable of detecting a situation that a desired SNR of a received signal can not be obtained at a base station by increase of transmission power of a mobile station which transmits the signal.

It is another object of this invention to provide a transmission power control system which is capable of saving vain battery consumption of a mobile station.

It is still another object of this invention to provide a transmission power control system which is capable of increasing a connection capacity of a mobile connection system.

Other object of this invention will become clear as the description proceeds.

According to a first aspect of this invention, a base station of a mobile communication system which adopts a transmission power control system comprises a communication monitor circuit to detect quality deterioration of radio communication between the base station and mobile stations. The communication monitor circuit comprises a monitor unit for monitoring a communication state of the radio communication. A judging unit is connected to the monitor unit to judge whether the communication state monitored by the monitor unit is worse than a predetermined state. A notifying unit is connected to the judging unit to notify an external circuit of the quality deterioration when the judging unit judges that the communication state is worse than the predetermined state.

According to a second aspect of this invention, a base station of a mobile communication system which adopts a transmission power control system to control transmission power of mobile stations by use of transmission power control bit signals includes receivers for demodulating transmission signals transmitted from the mobile stations to produce demodulated signals. Signal-to-noise ratio determining circuits are connected to the receivers respectively to determine signal-to-noise ratios of the demodulated signals. Transmission power control bit generators are connected to the signal-to-noise ratio determining circuits respectively to generate the transmission power control bit signals on the basis of the signal-to-noise rations. The base station comprises a communication state monitor circuit which is connected to the receivers to detect quality deterioration of a communication state of radio communication between the base station and the mobile stations. A transmission power bit adjusting circuit is connected to the communication state monitor circuit and the transmission power control bit generators to control the transmission power control bit signals so as to suppress increase of transmission power of the mobile stations when the communication state monitor circuit detects the quality deterioration.

According to a third aspect of this invention, a transmission power control system is for use in a base station of a mobile communication system to control transmission power of mobile stations by use of transmission power control bit signals. The base station includes receivers for demodulating transmission signals transmitted from the mobile stations to produce demodulated signals. Signal-to-noise ratio determining circuits are connected to the receivers respectively to determine signal-to-noise ratios of the demodulated signals. Transmission power control bit generators are connected to the signal-to-noise ratio determining circuits respectively to generate the transmission power control bit signals on the basis of the signal-to-noise rations. The transmission power control system comprises a communication state monitor circuit connected to the receivers to detect quality deterioration of a communication state of radio communication between the base station and the mobile stations. A transmission power bit adjusting circuit is connected to the communication state monitor circuit and the transmission power control bit generators to control the transmission power control bit signals so as to suppress increase of transmission power of the mobile stations when the communication state monitor circuit detects the quality deterioration.

According to a fourth aspect of this invention, a method of controlling transmission power of mobile stations from a base station of a mobile communication system, comprising the steps of monitoring, with a monitor unit located in the base station, a communication state of the radio communication, judging, with a judging unit connected to the monitor unit in the base station, whether the communication state monitored at the monitoring step is worse than a predetermined state, and notifying, from a notifying unit connected to the judging unit in the base station, an external circuit of the quality deterioration when judgement that the communication state is worse than the predetermined state is made at the judging step.

According to a fifth aspect of this invention, a method of controlling transmission power of mobile stations of a mobile communication system by use of transmission power control bit signals transmitted from a base station, the base station including receivers for demodulating transmission signals transmitted from the mobile stations to produce demodulated signals, signal-to-noise ratio determining circuits connected to the receivers respectively for determining signal-to-noise ratios of the demodulated signals and transmission power control bit generators connected to the signal-to-noise ratio determining circuits respectively for generating the transmission power control bit signals on the basis of the signal-to-noise rations, comprising the steps of detecting, with a communication state monitor circuit, quality deterioration of a communication state of radio communication between the base station and the mobile stations, and controlling, with a transmission power control bit adjusting circuit connected to the communication state monitor circuit and the transmission power control bit generators, the transmission power control bit signals so as to suppress increase of transmission power of the mobile stations when the quality deterioration is detected at the detecting step.

DESCRIPTION OF THE PREFERRED EMBODIMENTS

Figure 1:
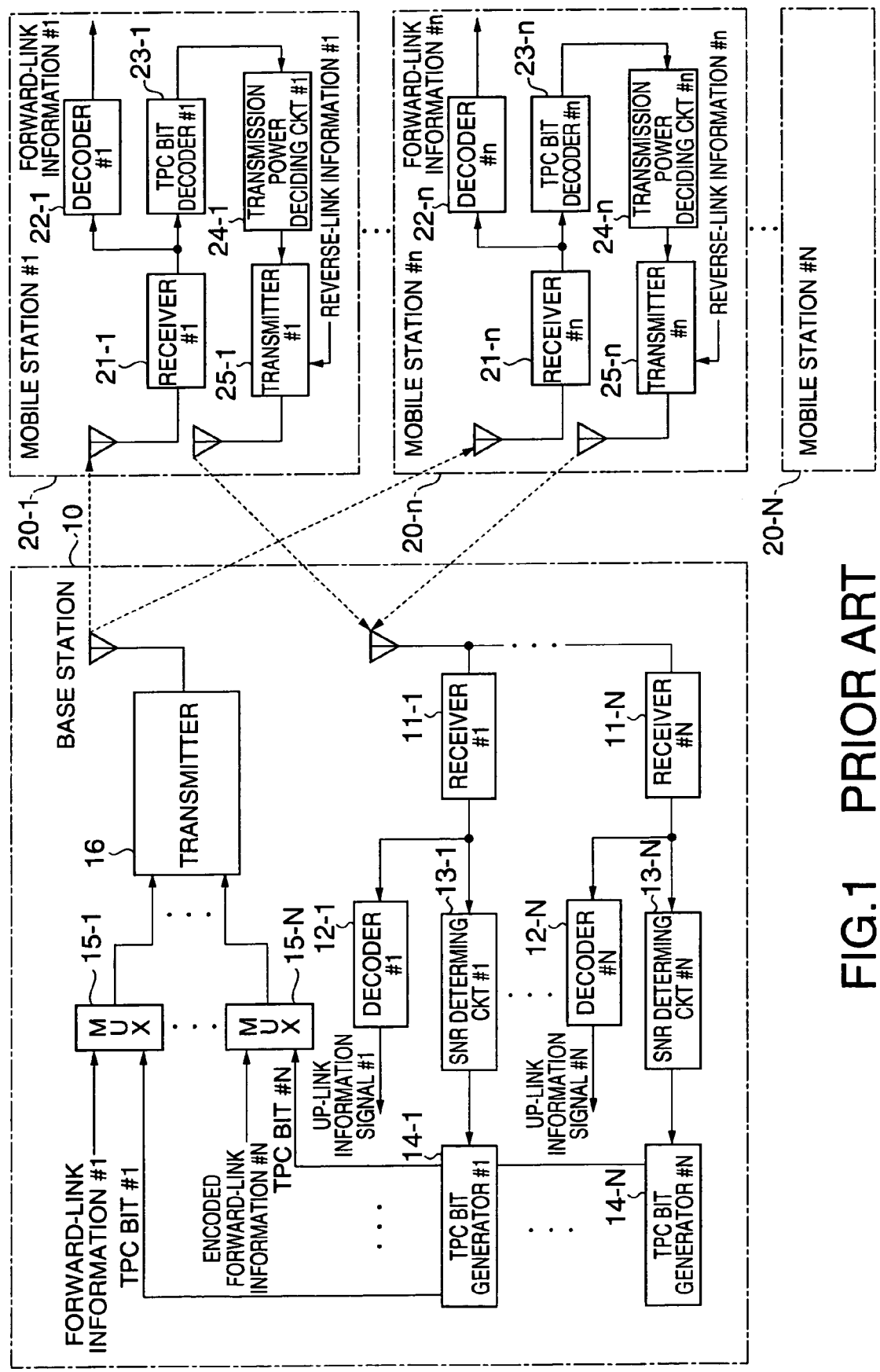
FIG. 1 is a block diagram of a mobile communication system adopting a conventional transmission power control system.
Figure 2:
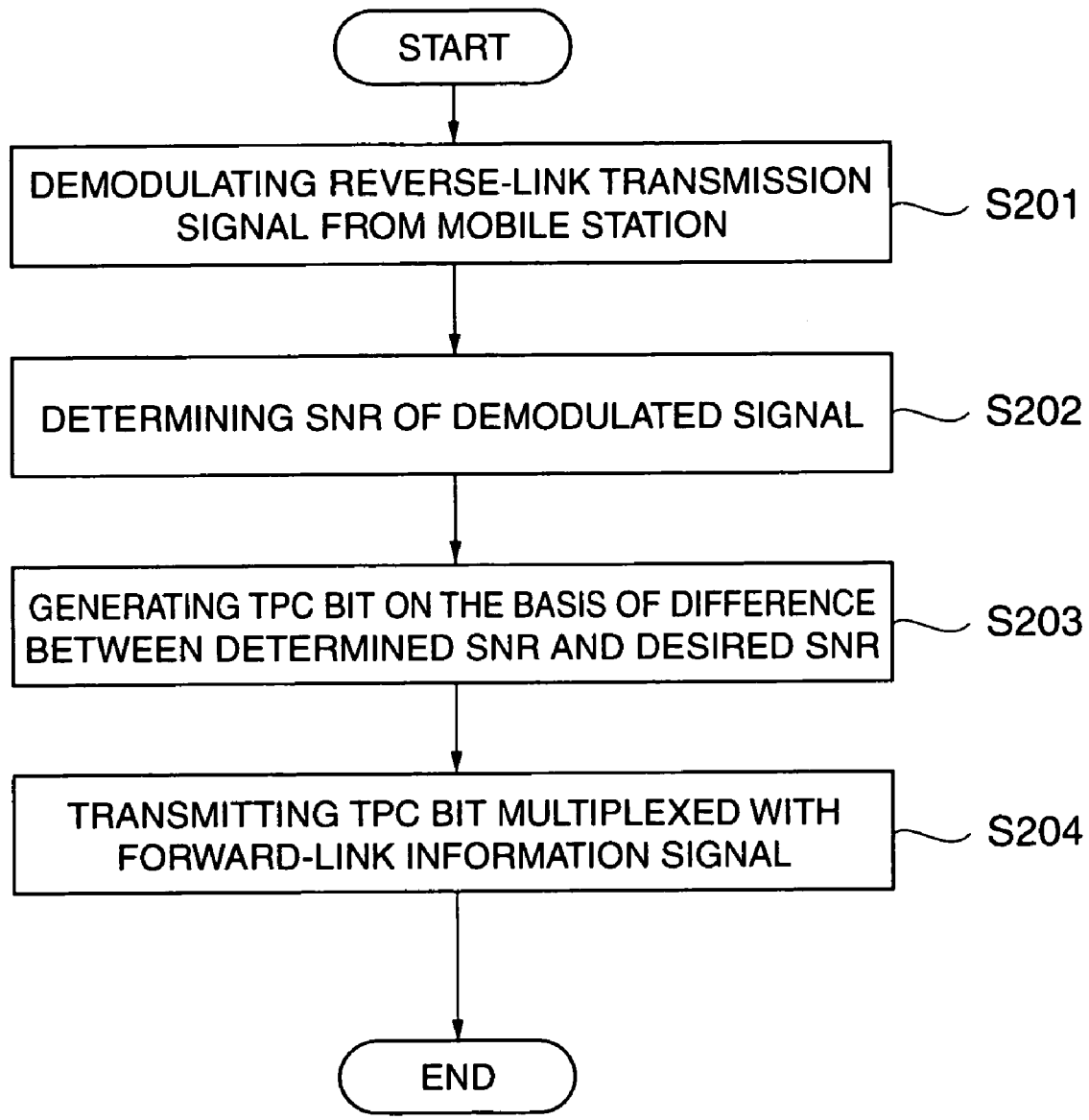
FIG. 2 is a flowchart for describing an operation of a base station of the mobile communication system of FIG. 1.
Figure 3:
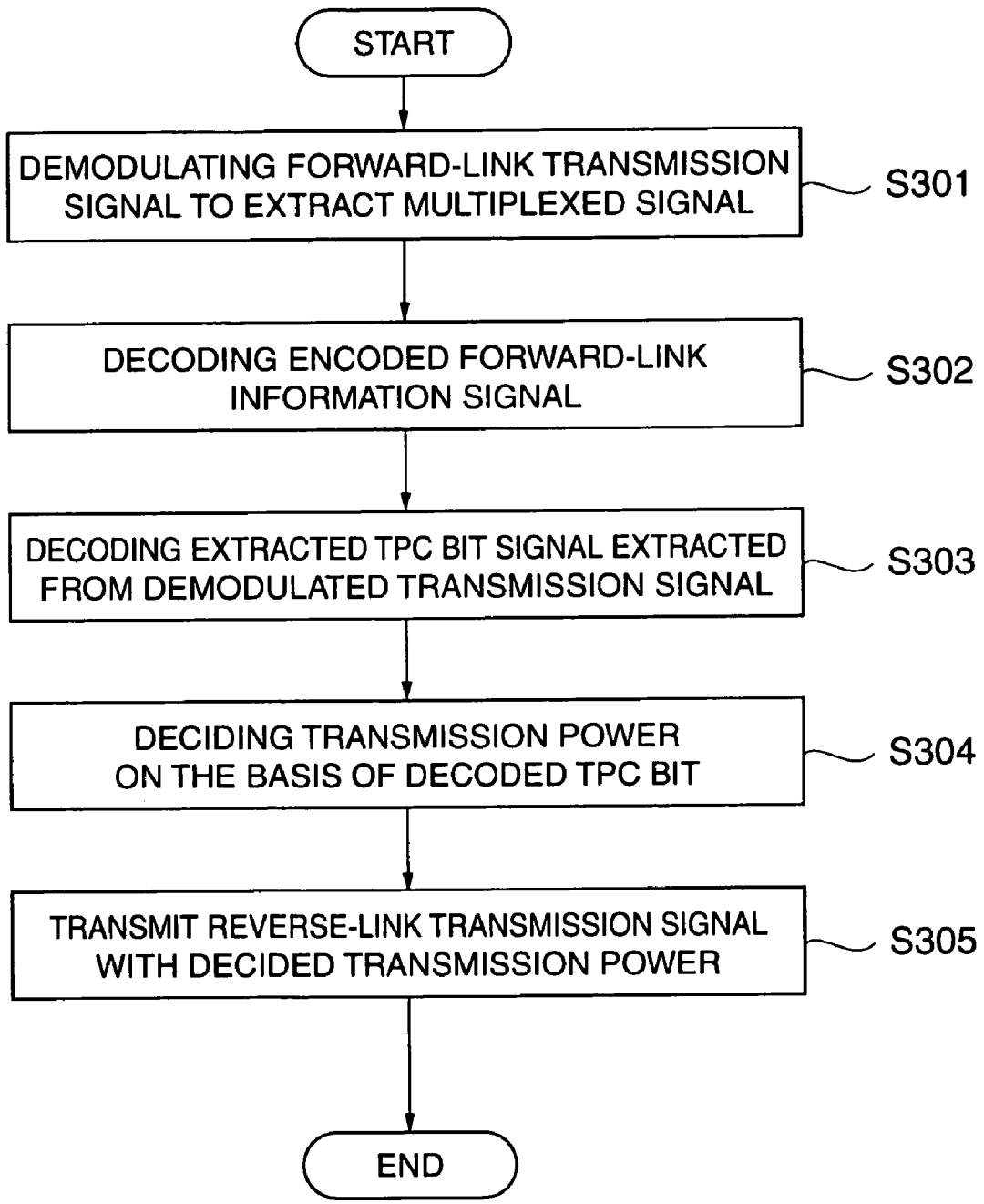
FIG. 3 is a flowchart for describing an operation of a mobile station of the mobile communication system of FIG. 1.

Referring to FIGS. 1 through 3, description will be at first directed to a conventional transmission power control system for a better understanding of this invention.

The conventional transmission power control system is applied to a mobile communication system adopting CDMA system. The mobile communication system comprises base stations and mobile stations. Hereinafter, the description is made about one of the base stations for convenience of explanation. In FIG. 1, the base station 10 comprises receivers 11-1 to 11-N. Decoders 12-1 to 12-N are connected to the receivers 11-1 to 11-N respectively. Signal-to-noise (SNR) determining circuit 13-1 to 13-N are also connected to the receivers 11-1 to 11-N respectively. Transmission power control (TPC) bit generators 14-1 to 14-N are connected to the SNR determining circuit 13-1 to 13-N. Multiplexers 15-1 to 15-N are connected to the TPC bit generators 14-1 to 14-N respectively. A transmitter 16 is connected to all of the multiplexers 15-1 to 15-N. A combination of the SNR determining circuit 13-1 to 13-N and the TPC bit generators 14-1 to 14-N serves as a part of the conventional transmission power control system.

The base station can simultaneously communicate with N (N: a natural number) of the mobile stations located in a cell covered by the base station. This is because the number of the receivers 11-1 to 11-N is N. Hereinafter, it is assumed that N of the mobile stations simultaneously communication with the base station. Additionally, the description is mainly made about an n-th ($1 \leq n \leq N$) mobile station, because the mobile stations have the same structure and operations.

The n-th mobile station 20-$n$ comprises a receiver 21-$n$. A decoder 22-$n$ connected to the receiver 21-$n$. A transmission power control (TPC) bit decoder 23-$n$ is also connected to the receiver 21-$n$. A transmission power deciding circuit 24-$n$ is connected to the bit decoder 23-$n$. A transmitter 25-$n$ is connected to the transmission power deciding circuit 24-$n$. A combination of the TPC bit decoder 23-$n$ and the transmission power deciding circuit 24-$n$ serves as another part of the conventional transmission power control system.

Referring to FIGS. 2 and 3, an operation of the mobile communication system will be mentioned soon.

In the base station, the receiver 11-$n$ selectively receives a reverse-link (or up-link) transmission signal transmitted by the mobile station 20-$n$ and demodulates it to produce a demodulated reverse-link transmission signal (Step S201). The receiver 11-$n$ supplies the demodulated reverse-link transmission signal to both of the decoder 12-$n$ and the SNR determining circuit 13-$n$.

The decoder 12-$n$ decodes the demodulated reverse-link transmission signal into a decoded reverse-link signal as a reverse-link information signal. Because the decoded reverse-link signal is unimportant for this invention, nothing will be made about processing for the decoded reverse-link signal in below.

The SNR determining circuit 13-$n$ determines a signal-to-noise ratio (SNR) of the demodulated reverse-link transmission signal and supplies a SNR signal representing the determined SNR to the TPC bit generator 14-$n$ (Step S202).

The TPC bit generator 14-$n$ finds a difference between the determined SNR determined by the SNR determining circuit 13-$n$ and a desired SNR memorized therein to generate a transmission power (TPC) bit signal (Step S203). When the determined SNR is smaller than the desired SNR, the TPC bit generator 14-$n$ generates a first TPC bit signal as the TPC bit signal on the basis of the difference to require the mobile station 20-$n$ to increase its transmission power. Conversely, when the determined SNR is larger than the desired SNR (or the higher threshold), the TPC bit generator 14-$n$ generates a second TPC bit signal as the TPC bit signal on the basis of the difference to require the mobile station 20-$n$ to decrease the transmission power. The TPC bit generator 14-$n$ supplies the TPC bit signal to multiplexer 15-$n$.

The multiplexer 15-$n$ multiplexes the TPC bit signal with an encoded forward-link information signal for the mobile station 20-$n$ to produce a multiplexed signal. Generally, error-correcting code is used for the encoded forward-link information signal to correct bit errors caused in a transmission line. The multiplexer 15-$n$ supplies the multiplexed signal to the transmitter 16 (Step S204).

The transmitter 16 multiplexes the multiplexed signal supplied from the multiplexer 15-$n$ and other multiplexed signal the remaining multiplexer 15-1 to 15-N by the use of a code division multiplex to produce a forward-link (or down-link) transmission signal. The transmitter 16 transmits the forward-link transmission signal to the mobile stations 20-1 to 20-N.

The mobile station 20-$n$ receives the forward-link transmission signal. In the mobile station 20-$n$, the receiver 21-$n$ demodulates the forward-link transmission signal and extracts the multiplexed signal produced by the multiplexer 15-$n$ (Step S301). The mobile station 20-$n$ supplies the extracted multiplexed signal to both of the decoder 22-$n$ and the TPC decoder 23-$n$.

The decoder 22-$n$ extracts the encoded forward-link information signal from the extracted multiplexed signal and decodes the encoded forward-link information signal into a decoded forward-link information signal (Step S 302). Error detection and correction is made for the decoded forward-link information signal. Because the decoded forward-link information is not important for this invention, no description will be made about processing for the decoded forward-link information signal.

On the other hand, the TPC bit decoder 23-$n$ extracts the TPC bit signal from the extracted multiplexed signal and decodes the extracted TPC bit signal into a decoded TPC bit signal (Step S303). The TPC bit decoder 23-$n$ supplies the decoded TPC bit signal to the transmission power deciding circuit 24.

The transmission power deciding circuit 24 decides the transmission power of the transmitter 25 in response to the decoded TPC bit signal (Step S304). However, the transmission power deciding circuit 24 restricts the transmission power under a predetermined maximum power.

The transmitter 25 transmits the reverse-link transmission signal with the decided transmission power decided by the transmission power deciding circuit 24 thereafter (Step S305).

When the number of the mobile stations, which communicate with the base station, increases, and interference between the reverse-link transmission signals of the mobile stations becomes large, the conventional transmission power control system makes the mobile stations increase the transmission power. Similarly, when interference from adjoining cells increases, the base station also makes the mobile stations increase the transmission power. In these cases, the increase of the transmission power of the mobile stations often makes the SNRs of the demodulated signals at the base station worse. The transmission power control system can not decide whether the increase of the transmission power of the mobile station improves the SNRs of the demodulated signals or not. In addition, the mobile stations waste batteries because they transmit the reverse-link transmission signals with the maximum power in these cases. Furthermore, it makes the interference for adjoining cells large and makes connection capacity of the mobile communication system small that the mobile stations transmit the reverse-link transmission signals with the maximum power.

Referring to FIGS. 4 through 7, the description will proceed to a transmission power control system according to a first embodiment of this invention. Similar parts are designated by the same reference numerals and descriptions thereof are omitted.

Figure 4:
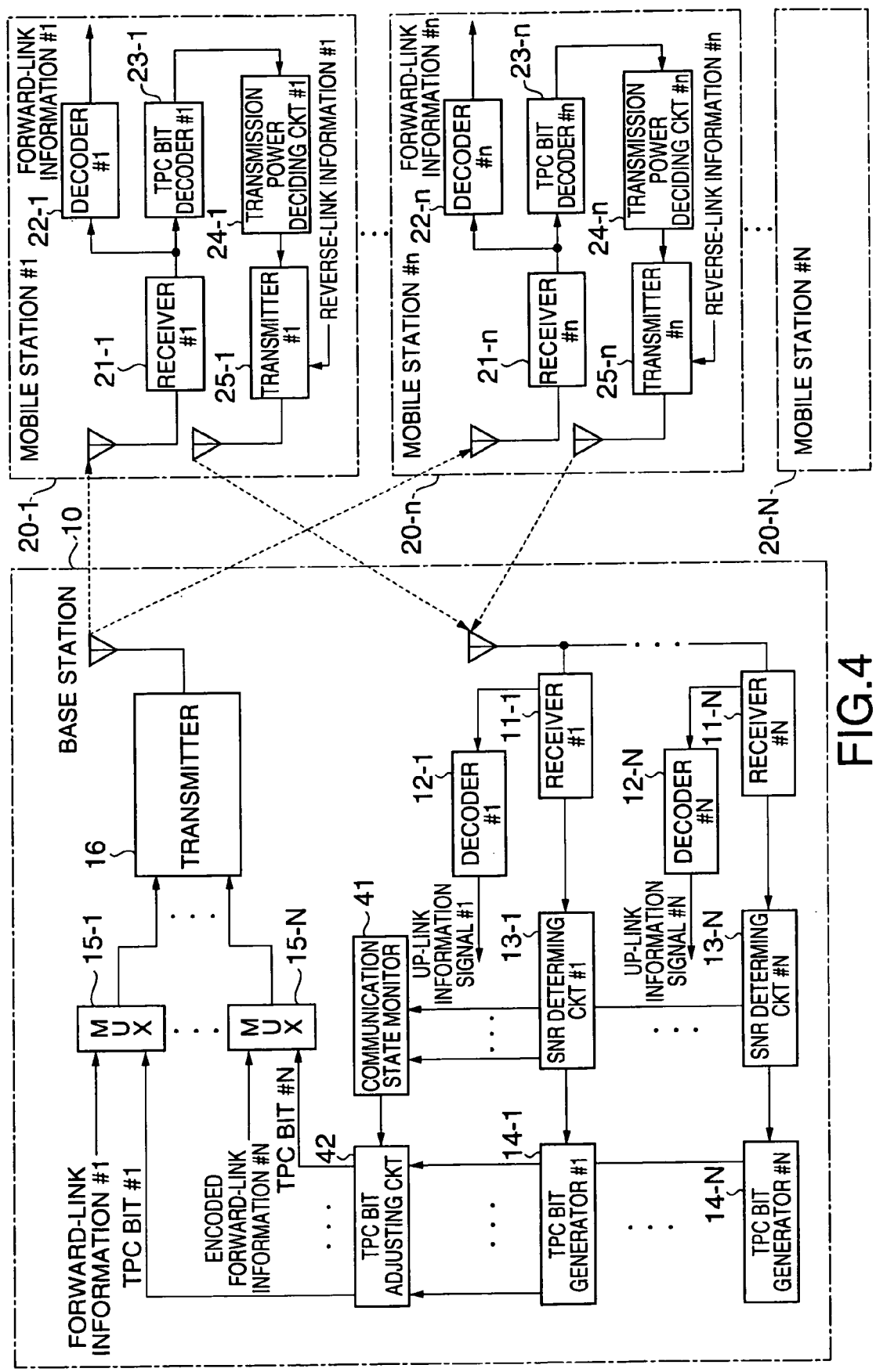
FIG. 4 is a block diagram of a mobile communication system adopting a transmission power control system according to a first embodiment of this invention.

In FIG. 4, the transmission power control system comprises a communication state monitor 41 and a transmission power control bit adjusting circuit 42 in the base station 10.

The communication state monitor 41 is connected to the SNR determining circuits 13-1 to 13-N while the TPC bit adjusting circuit 42 is connected to the communication state monitor 41, the TPC bit generators 14-1 to 14-N and the multiplexers 15-1 to 15-N.

Figure 5:
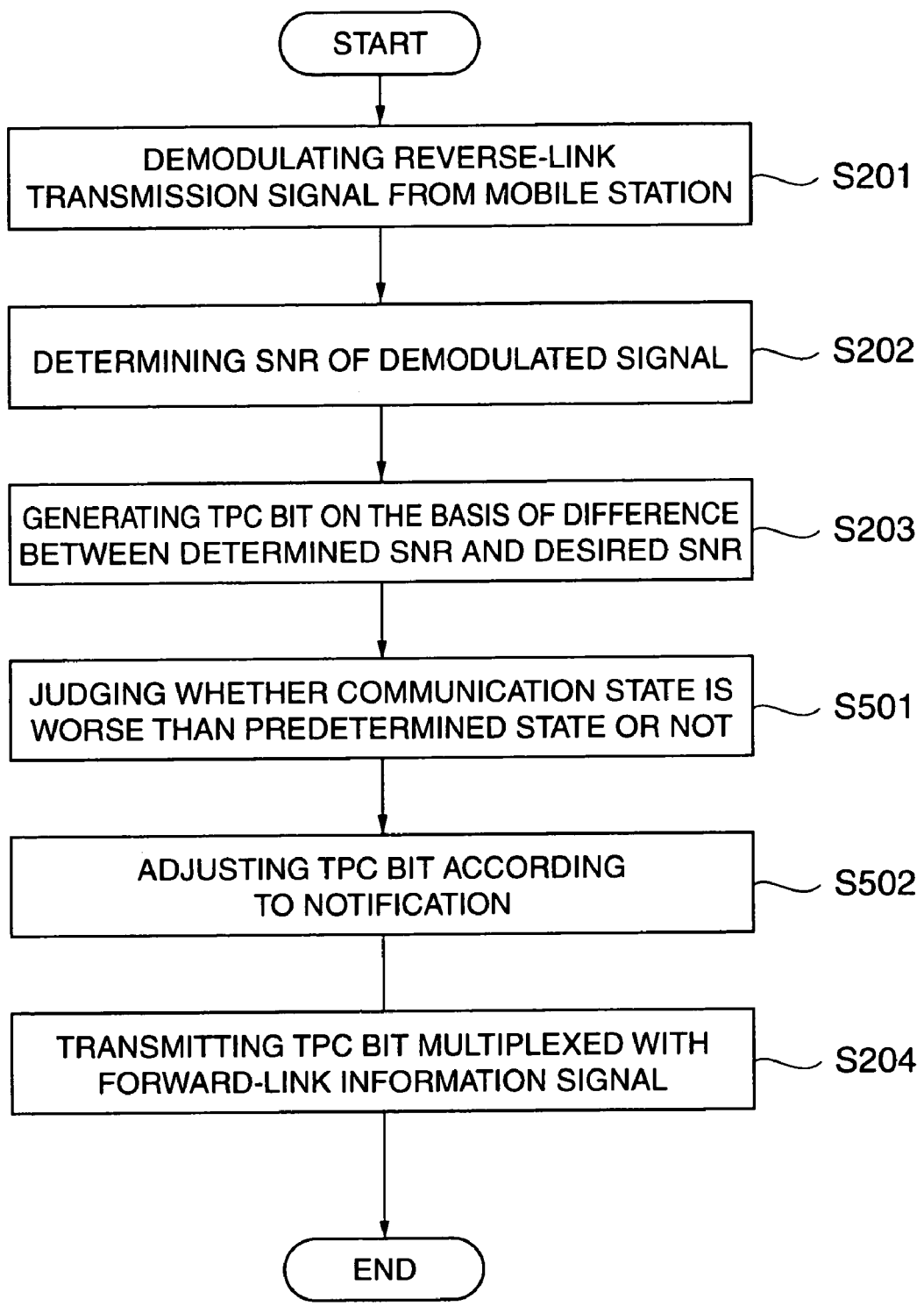
FIG. 5 is a flowchart for describing an operation of a base station of the mobile communication system of FIG. 4.

For the base station 10, the transmission power control system operates according a flowchart illustrated in FIG. 5.

At a step S501 of FIG. 5, the communication state monitor 41 receives the SNR signals supplied from the SNR bit determining circuits 13-1 to 13-N and decides whether a communication state between the base station 10 and the mobile stations 20-1 to 20-N keeps worse than a predetermined state for a predetermined time. When the communication state keeps worse than the predetermined state for the predetermined time, it can be considered that many of the detected SNRs are lower than the desired SNR because of the interference and the detected SNRs can not be improved by increase of the transmission power of the mobile stations. The communication state monitor 41 notifies the TPC bit adjusting circuit 42 of quality deterioration of the communication between the base station 10 and the mobile stations 20-1 to 20-N when the communication state keeps worse than the predetermined state for the predetermined time.

Successively, the TPC bit adjusting circuit 42 adjusts the TPC bit signals supplied from the TPC generators 14-1 to 14-N according to the notification of the quality deterioration supplied from the communication state monitor 41 (Step S502). The TPC bit adjusting circuit 42 supplies the adjusted TPC bit signals instead of the TPC bit signal generated by the TPC generators 14-1 to 14-N to the multiplexers 15-1 to 15-N.

Figure 6:
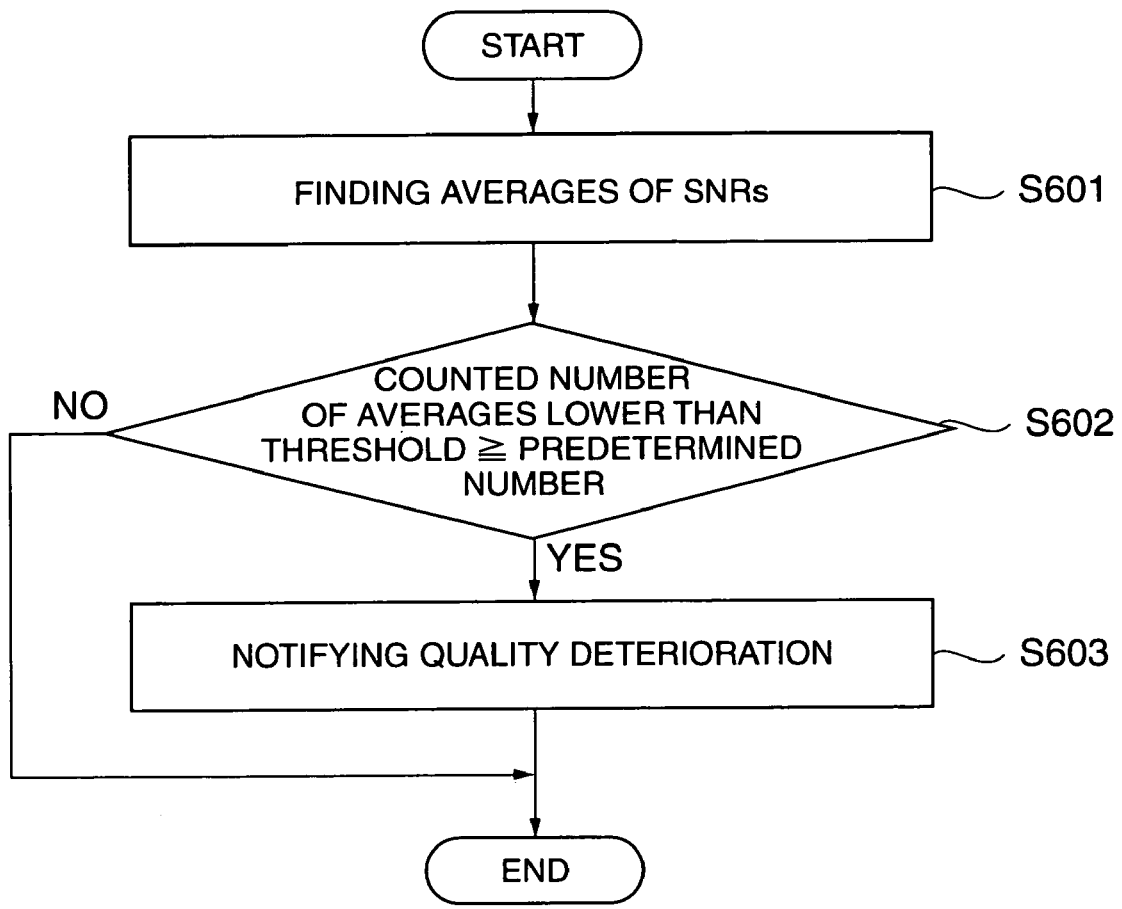
FIG. 6 is a flowchart for describing an operation of a communication state monitor used in the mobile communication system of FIG. 4.

Referring to FIG. 6, the operation of the communication state monitor 41 is described in more detail. The communication state monitor 41 monitors a communication state of a radio communication between the base station 10 and the mobile stations 20-1 to 20-N as follows.

At first, the communication state monitor 41 finds averages of the determined SNRs per a predetermined time individually on the basis of the SNR signals supplied from the SNR determining circuits 13-1 to 13-N (Step S601).

Next, the communication state monitor 41 compares each of the averages with a predetermined threshold which is considerably lower than the desired SNR. Then, the communication state monitor 41 counts the number of the averages each of which is lower than the predetermined threshold. Furthermore, the communication sate monitor 41 compares the counted number with a predetermined number (Step S602).

When the counted number is equal to or lager than the predetermined number, the communication state monitor 41 judges that the communication state is worse than the predetermined state and notifies the TPC bit adjusting circuit 42 of the quality deterioration (Step S603). On the other hand, the communication state monitor 41 does nothing when the counted number is smaller than the predetermined number.

Thereafter, the communication state monitor 41 repeats the operation as shown in FIG. 6 at regular time intervals.

Figure 7:
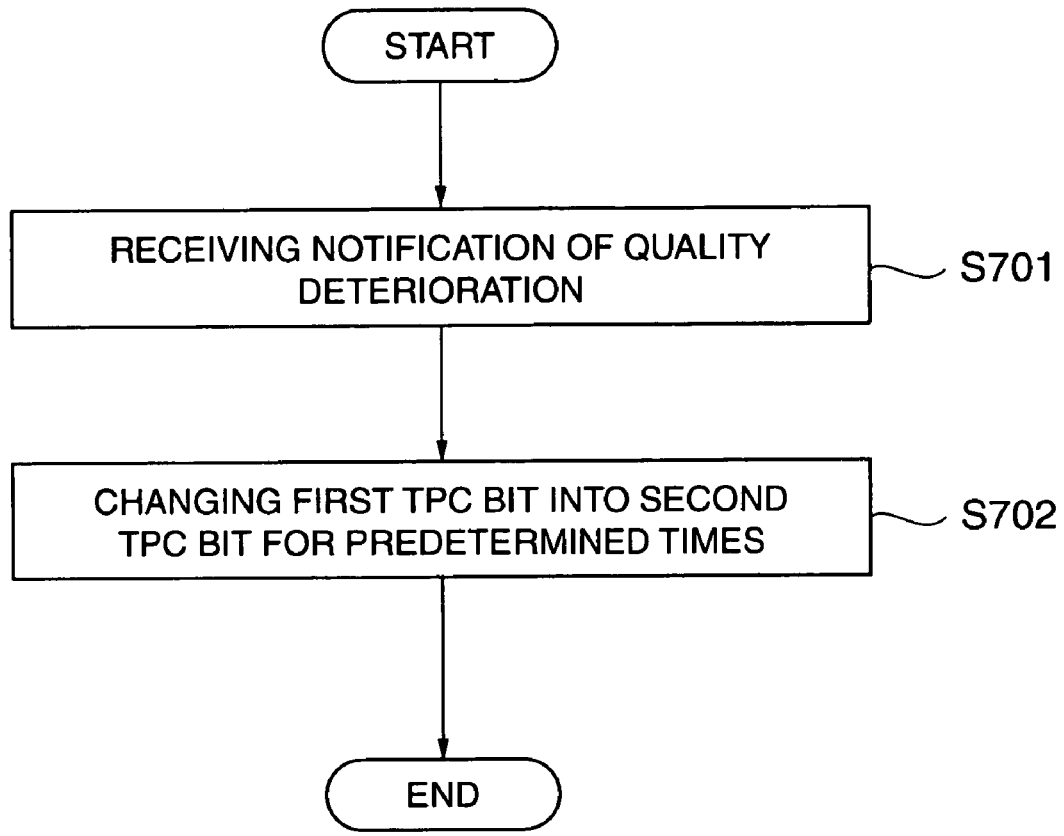
FIG. 7 is a flowchart for describing an operation of a transmission power control bit adjusting circuit used in the mobile communication system of FIG. 4.

AS illustrated in FIG. 7, when the TPC bit adjusting circuit 42 receives the notification of the quality deterioration from the communication state monitor (Step S701), it changes the first TPC bit signals of the TPC bit signals supplied from the TPC bit generator 14-1 to 14-N into the second TPC bit signals predetermined times (Step S702). In this event, the second TPC bit signals require the mobile stations to reduce the transmission power by the fixed value regardless of the difference between the measured SNRs and the desired SNR.

Because the second TPC bit signals require the corresponding mobile stations to reduce the transmission power, the interference is suppressed. As a result, it can be avoided that the mobile stations waste batteries and that a connection capacity of the mobile communication system becomes small. Especially, in each of the adjoining cells, because the interference from the cell covered by the base station 10 is reduced, the number of the mobile stations communicating with the base station thereof becomes large.

Figure 8:
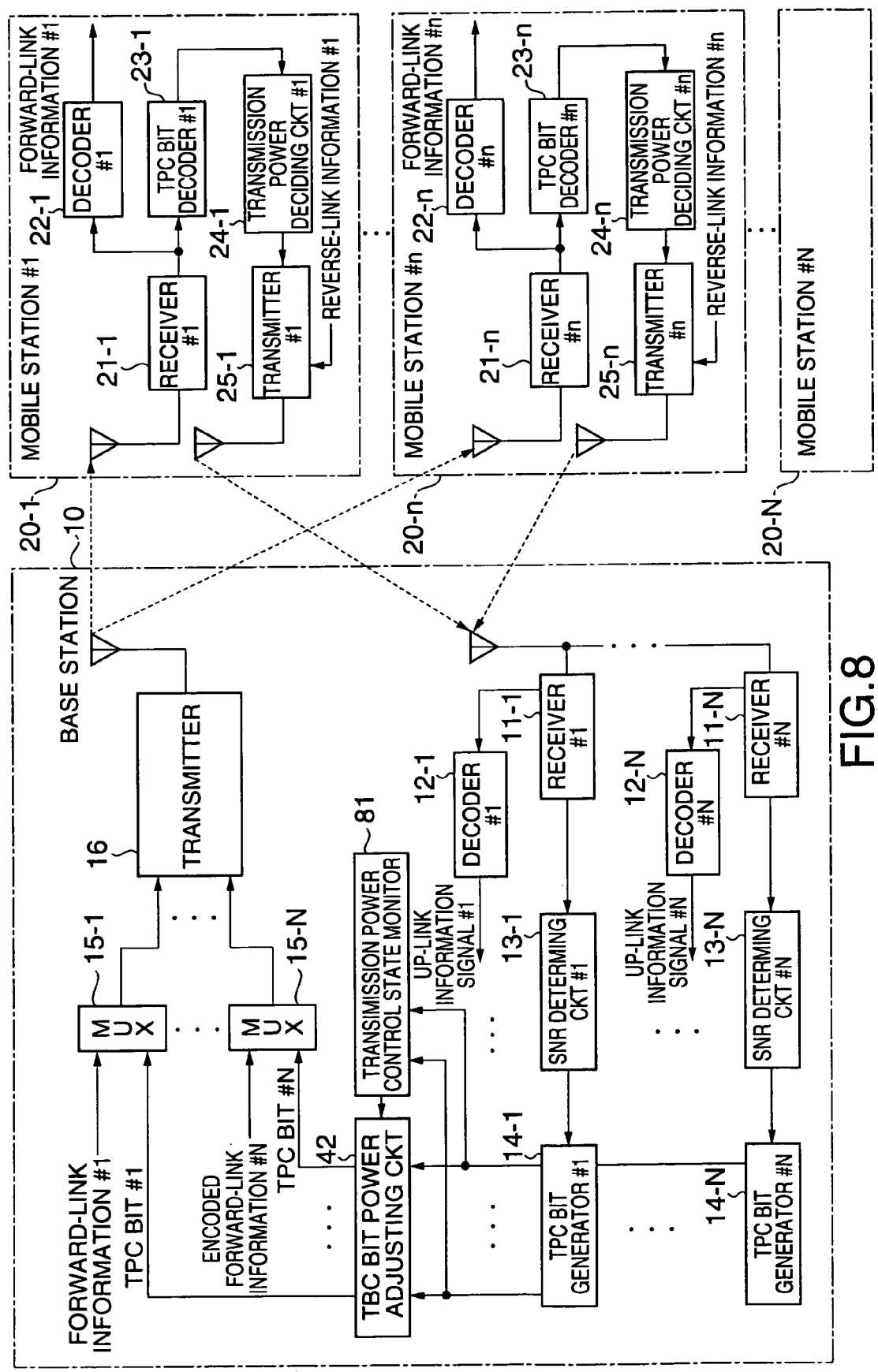
FIG. 8 is a block diagram of a mobile communication system adopting a transmission power control system according to a second embodiment of this invention.
Figure 9:
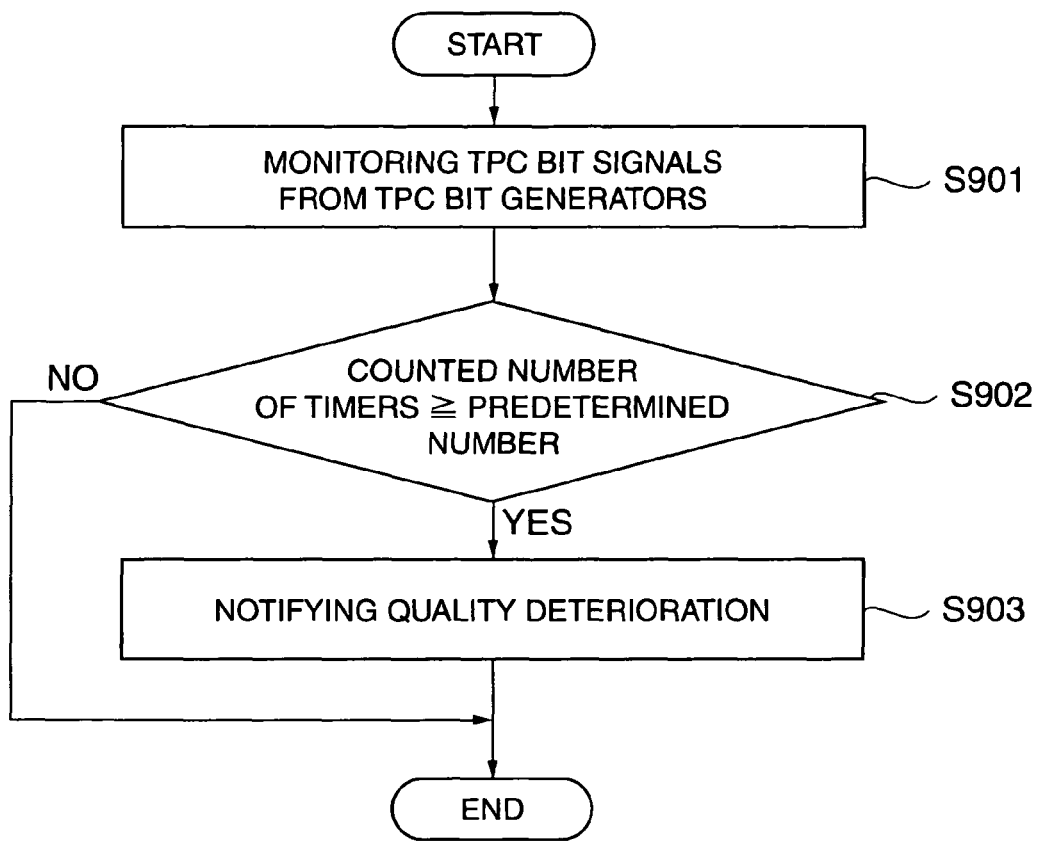
FIG. 9 is a flowchart for describing an operation of a communication state monitor used in the mobile communication system of FIG. 8.

Referring to FIGS. 8 and 9, the description is made about a transmission power control system according to a second embodiment of this invention.

In FIG. 8, the transmission power control system comprising a transmission power control state monitor 81 which is connected to the TPC bit generators 14-1 to 14-N and to the transmission power adjusting circuit 42.

The transmission power control state monitor 81 operates as illustrated in FIG. 9.

At a step S901 of FIG. 9, the transmission power control state monitor 81 monitors the TPC bit signals generated by the TPC bit generators 14-1 to 14-N as the communication state. The transmission power control state monitor 81 having timers (not shown) corresponding to the TPC bit generators 14-1 to 14-N respectively. Each of the timers counts time that the corresponding TPC bit generator successively generates the first TPC bit signals as the TPC bit signal. The transmission power control state monitor 81 counts the number of the timers each of which counts a time equal to or larger than a predetermined time.

The transmission power control state monitor 81 compares the counted number of the timers with a predetermined number at a step S902.

When the counted number is equal to or larger than the predetermined number, the transmission power control state monitor 81 notifies the transmission power adjusting circuit 42 of the quality deterioration at a step 903. On the other hand, when the counted number is lower than the predetermined number, the transmission power control state monitor 81 does nothing.

Figure 10:
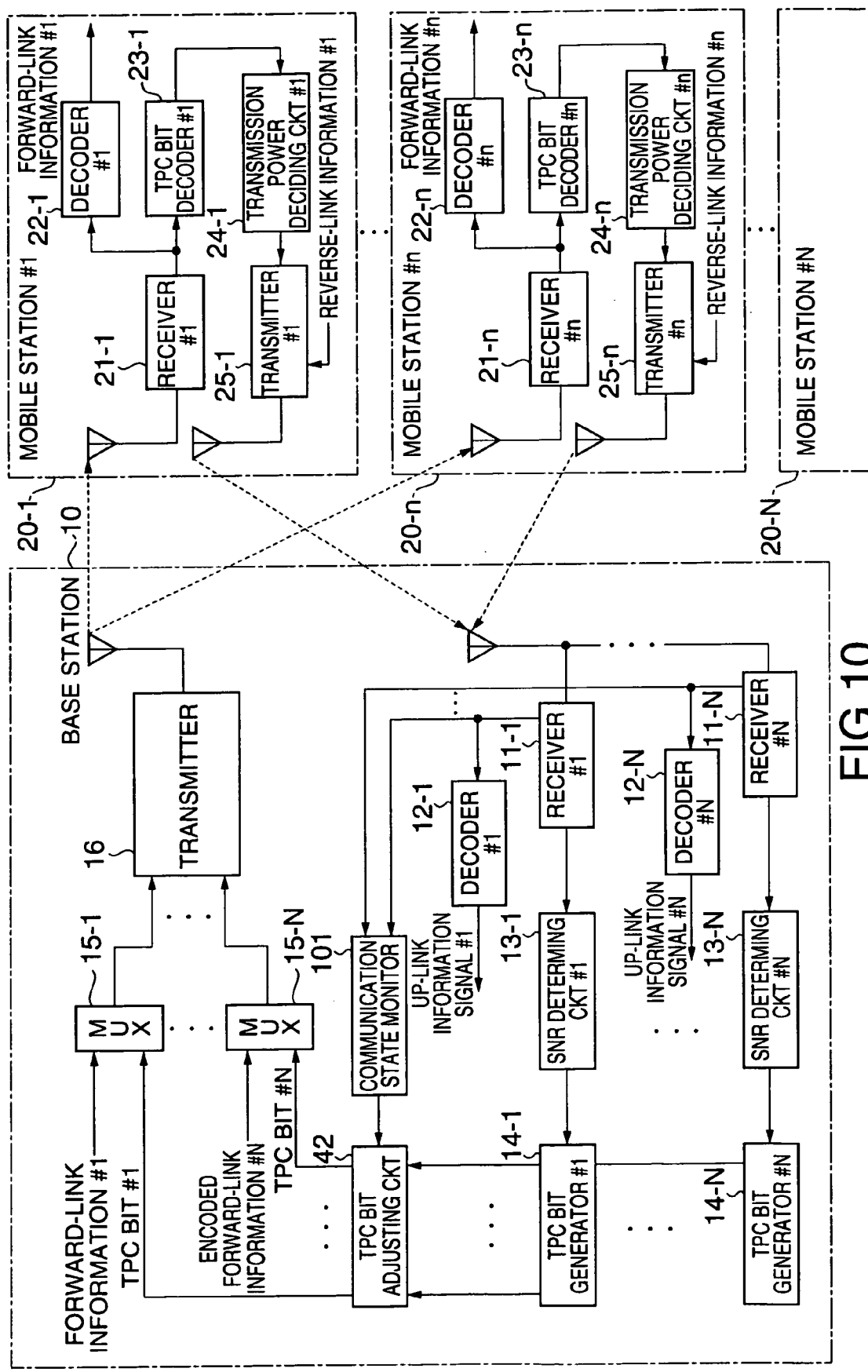
FIG. 10 is a block diagram of a mobile communication system adopting a transmission power control system according to a third embodiment of this invention.
Figure 11:
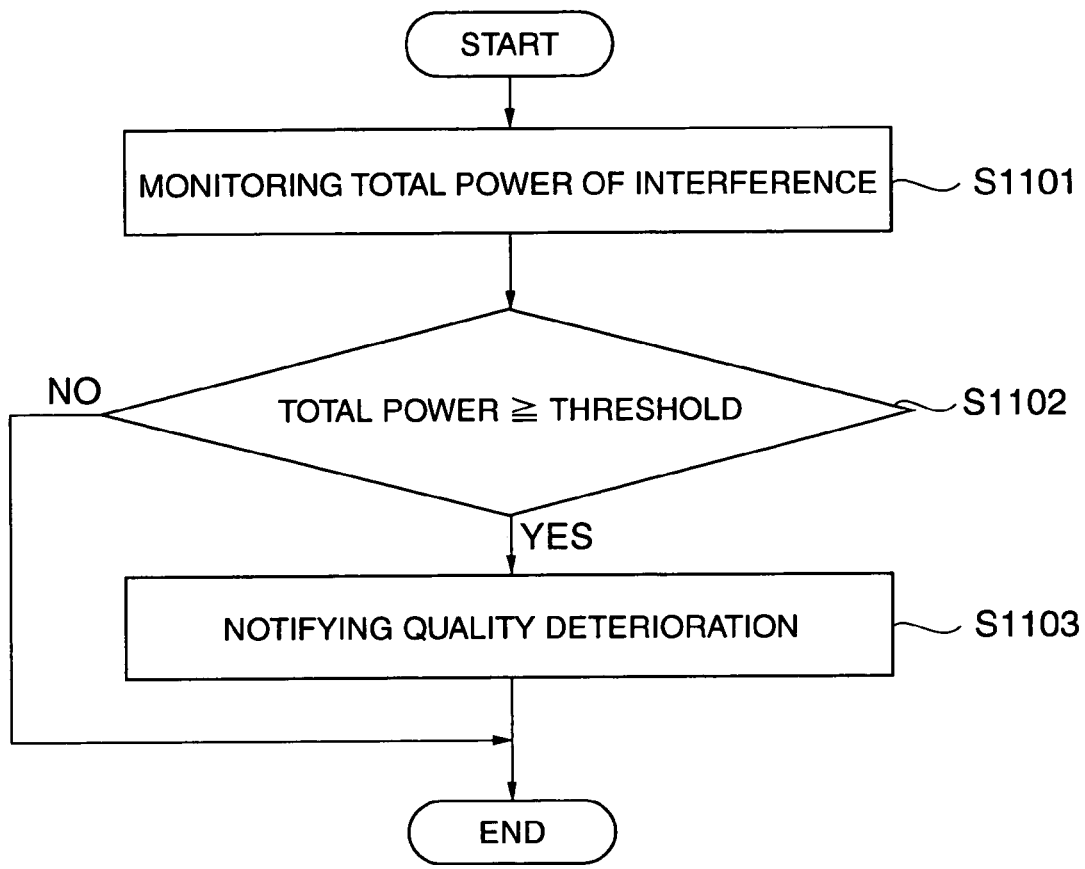
FIG. 11 is a flowchart for describing an operation of a communication state monitor used in the mobile communication system of FIG. 10.

Referring to FIGS. 10 and 11, the description is made about a transmission power control system according to a third embodiment of this invention.

In FIG. 10, the transmission power control system comprising a transmission power control state monitor 101 which is connected to the receiver 11-1 to 11-N and to the transmission power adjusting circuit 42.

The transmission power control state monitor 101 operates as illustrated in FIG. 11.

As shown in FIG. 11, the transmission power control state monitor 101 receives the demodulated signals from the receiver 11-1 to 11-N and monitors a total electric power of interference included in the demodulated signals as the communication state (Step S1101).

Next, the transmission power control state monitor 101 compares the total electric power with a predetermined value (Step S1102).

When the total electric power is equal to or larger than the predetermined value, the transmission power control state monitor 101 notifies the transmission power adjusting circuit 42 of the quality deterioration (Step S1103). On the other hand, when the total electric power is lower than the predetermined value, the transmission power control state monitor 101 does nothing.

Figure 12:
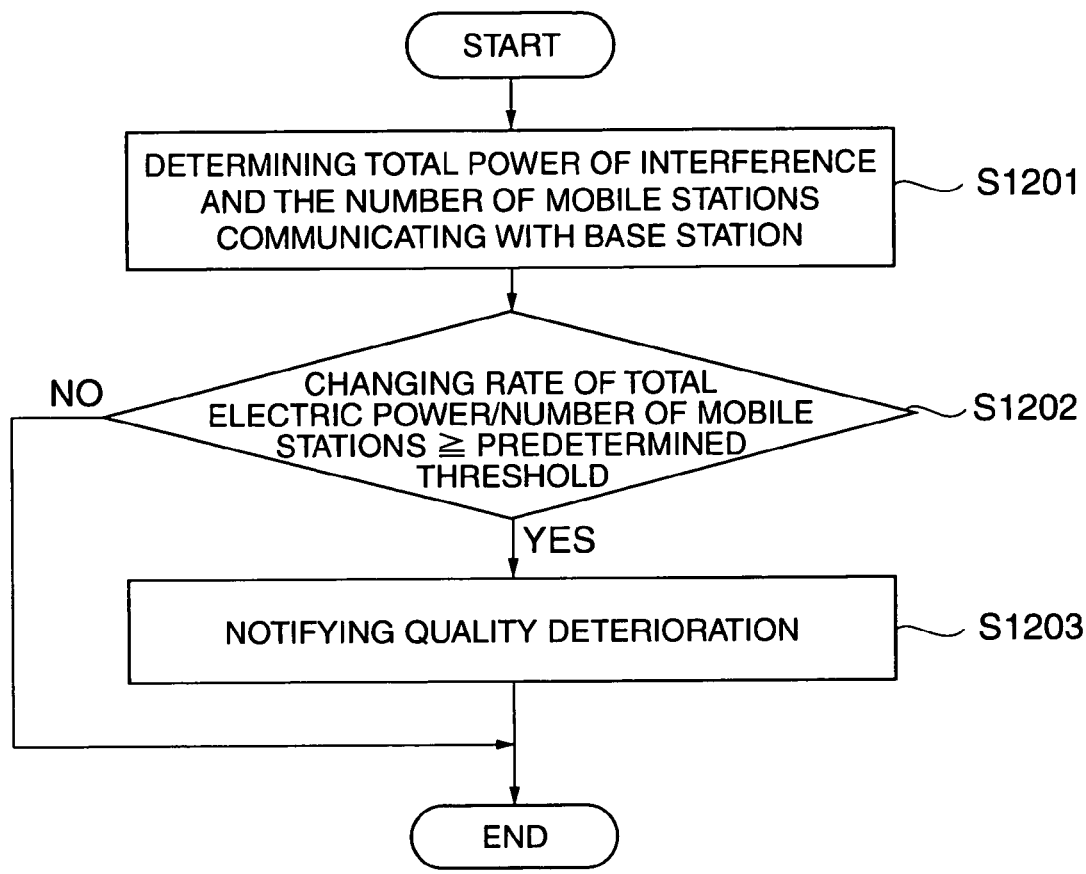
FIG. 12 is a flowchart for describing an operation of a communication state monitor used in a mobile communication system according to a fourth embodiment of this invention.

Referring to FIG. 12, the description is made about a transmission power control system according to a fourth embodiment of this invention. The transmission power control system is similar to that of FIG. 10 except for the operation of the transmission power control state monitor 101.

The transmission power control state monitor 101 operates as illustrated in FIG. 12.

As shown in FIG. 12, the transmission power control state monitor 101 receives the demodulated signals from the receiver 11-1 to 11-N. The transmission power control state monitor 101 determines not only a total electric power of interference included in the demodulated signals but also the number of the mobile stations communicating with the base station 10 (Step S1201). Then the transmission power control state monitor 101 monitors a ratio of the total electric power to the number of the mobile stations as the communication state.

Next, the transmission power control state monitor 101 compares a changing rate of the ratio of the total electric power to the number of the mobile stations with a predetermined threshold (Step S1202).

When the changing rate is equal to or larger than the predetermined threshold, the transmission power control state monitor 101 notifies the transmission power adjusting circuit 42 of the quality deterioration (Step S1203). On the other hand, when the changing rate is lower than the predetermined threshold, the transmission power control state monitor 101 does nothing.

Figure 13:
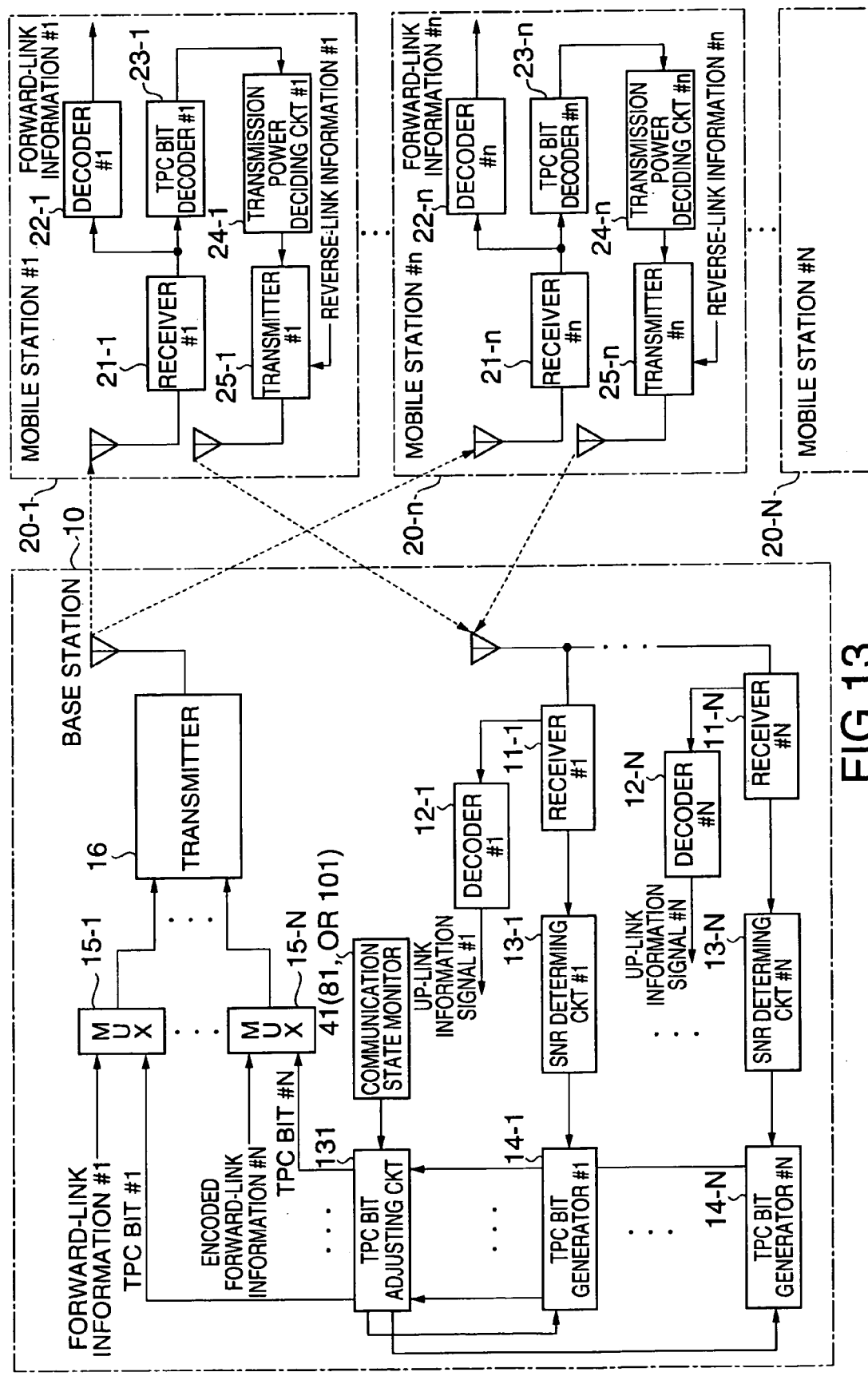
FIG. 13 is a block diagram of a mobile communication system adopting a transmission power control system according to a fifth embodiment of this invention.
Figure 14:
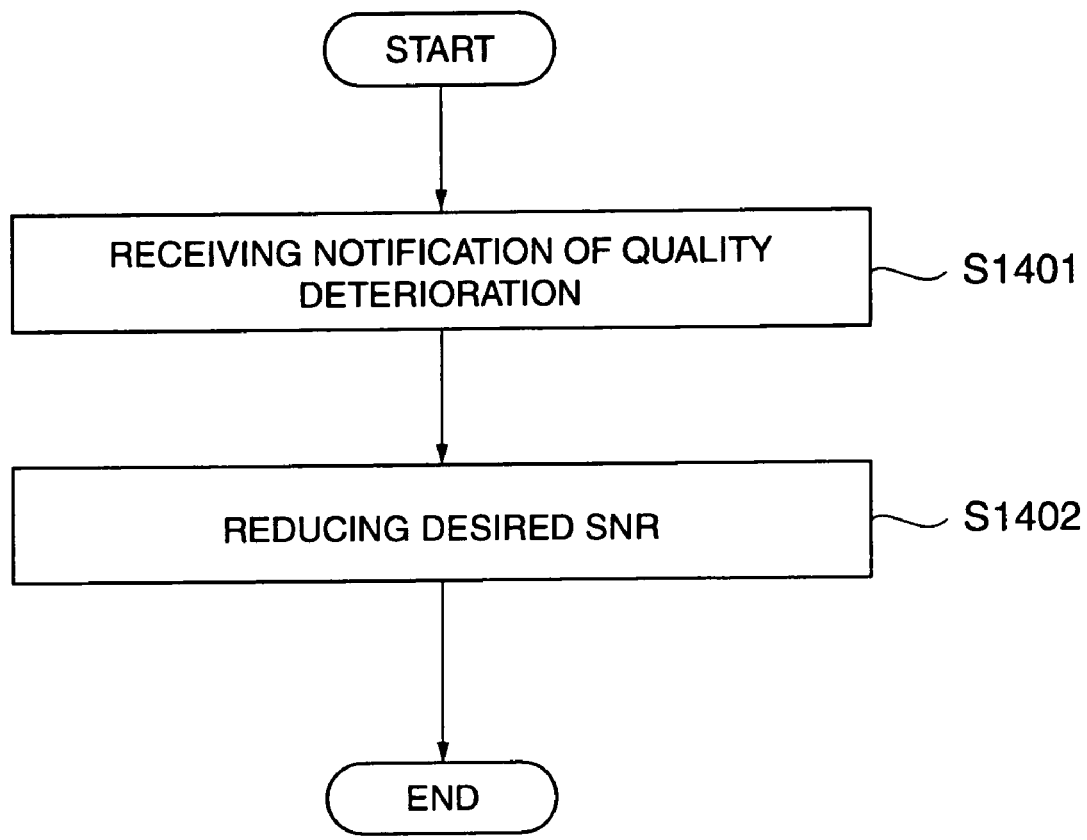
FIG. 14 is a flowchart for describing an operation of a transmission power control bit adjusting circuit used in the mobile communication system of FIG. 13.

Referring to FIGS. 13 and 14, the description is made about a transmission power control system according to a fifth embodiment of this invention.

In FIG. 13, the transmission power control system comprises a TPC bit adjusting circuit 131 which is connected to the TPC bit generators 14-1 to 14-N, the multiplexers 15-1 to 15-N and the communication state monitor 41 (or 81 or 101).

The TPC bit adjusting circuit 131 operates according to a flowchart of FIG. 14.

When the TPC bit adjusting circuit 131 receives the notification of the quality deterioration (Step S1401), it reduces the desired SNRs memorized in the TPC bit generator 14-1 to 14-N (Step S1402).

The reduction of the desired SNRs decreases the transmission power of the mobile stations. Accordingly, the interference is suppressed and the batteries of the mobile stations are saved. In addition, the connection capacity of the mobile communication system increases.

The reduction of the desired SNRs may be carried out at either all or selected some of the mobile stations. If the reduction is carried out at all of the mobile stations, it is unnecessary that the TPC bit adjusting circuit 131 receives the TPC bit signals supplied from the TPC bit generators 14-1 to 14-N. The selected mobile stations are, for example, those which generate the first TPC bit signals.

While this invention has thus far been described in conjunction with a few embodiments thereof, it will readily be possible for those skilled in the art to put this invention into practice in various other manners. For example, the transmission power of the mobile stations may be maintained when the quality deterioration is detected. This is because it is nothing that at least influence of the interference becomes large by increase of the transmission power of the mobile stations.

What is claimed is:

1. A base station of a mobile communication system comprising:
 a communication monitor circuit for detecting quality deterioration of radio communication with mobile stations, wherein:
 said communication monitor circuit comprises:
 a monitor unit for monitoring a communication state of a group of individual communication between the mobile stations and the base station of said radio communication;
 a judging unit coupled to said monitor unit for judging whether said communication state monitored by said monitor unit is worse than a predetermined state; and
 a notifying unit coupled to said judging unit for notifying an external circuit of said quality deterioration when said judging unit judges that said communication state is worse than said predetermined state.

2. A base station as claimed in claim 1, further comprising receivers for demodulating transmission signals transmitted from said mobile stations to produce demodulated signals, wherein:
 said monitor unit is coupled to said receivers for monitoring total interference electric power of said demodulated signals as said communication state; and
 said judging unit judges that said communication state is worse than said predetermined state when said total interference electric power is equal to or larger than a predetermined threshold.

3. A base station as claimed in claim 1, further comprising:
 receivers for demodulating transmission signals transmitted from said mobile stations to produce demodulated signals; and
 signal-to-noise ratio determining circuits coupled to said receivers respectively for determining signal-to-noise ratios of said demodulated signals, wherein:
 said monitor unit, coupled to said signal-to-noise ratio determining circuits, monitors said signal-to-noise ratios as said communication state; and
 said judging unit judges that said communication state is worse than said predetermined state when the number of signal-to-noise ratios, each of which is smaller than a predetermined value, is equal to or larger than a predetermined threshold.

4. A base station as claimed in claim 1, further comprising:
 receivers for demodulating transmission signals transmitted from said mobile stations to produce demodulated signals;
 signal-to-noise ratio determining circuits coupled to said receivers respectively for determining signal-to-noise ratios of said demodulated signals; and
 transmission power control bit generators coupled to said signal-to-noise ratio determining circuits, respectively, for generating transmission power control bit signals based on said signal-to-noise rations, wherein:
 said monitor unit, coupled to said transmission power control bit generators, monitors said transmission power control bit signals as said communication state; and
 said judging unit judges that said communication state is worse than said predetermined state when the number of said transmission power control bit signals, each of which require an increase of transmission power, is equal to or larger than a predetermined threshold.

5. A base station as claimed in claim 1, further comprising;
 receivers for demodulating transmission signals transmitted from said mobile stations to produce demodulated signals, wherein:
 said monitor unit, coupled to said receivers, monitors total interference electric power of said demodulated signals and the number of said mobile terminals communicating with said base station as said communication state; and
 said judging unit judges that said communication state is worse than said predetermined state when a changing rate of a ratio of said total interference electric power to the number of said mobile terminals communicating with said base station is equal to or larger than a predetermined threshold.

6. A base station of a mobile communication system comprising:
- receivers for demodulating transmission signals transmitted from mobile stations to produce demodulated signals
- signal-to-noise ratio determining circuits coupled to said receivers, respectively, for determining signal-to-noise ratios of said demodulated signals;
- transmission power control bit generators coupled to said signal-to-noise ratio determining circuits, respectively, for generating said transmission power control bit signals based on said signal-to-noise ratios;
- a communication state monitor circuit coupled to said receivers for monitoring a communication state of a group of individual communication between the mobile stations and the base station of said radio communication, and detecting quality deterioration of the communication state of radio communication between said base station and said mobile stations; and
- a transmission power bit adjusting circuit coupled to said communication state monitor circuit and said transmission power control bit generators for controlling said transmission power control bit signals so as to suppress an increase of transmission power of said mobile stations when said communication state monitor circuit detects said quality deterioration.

7. A base station as claimed in claim 6, wherein said transmission power control bit generators generate the transmission power control bit signals which requires an increase of transmission power of said mobile stations when signal-to-noise ratios are equal to or lower than a desired value; and
- said transmission power control bit adjusting circuit decreases said desired value to suppress an increase of transmission power of said mobile stations when said communication state monitor circuit detects said quality deterioration.

8. A base station as claimed in claim 6, wherein:
- said transmission power control bit adjusting circuit changes said transmission power control bit signals so that said transmission power control bit signals require a decrease of said transmission power of said mobile stations.

9. A base station as claimed in claim 6, wherein said communication state monitor circuit comprises:
- a monitor unit for monitoring said communication state of said radio communication;
- a judging unit coupled to said monitor unit for judging whether said communication state monitored by said monitor unit is worse than a predetermined state; and
- a notifying unit coupled to said judging unit for notifying said transmission power control bit adjusting unit of said quality deterioration when said judging unit judges that said communication state is worse than said predetermined state.

10. A base station as claimed in claim 6, wherein:
- said communication state monitor circuit, is connected to said receivers, monitors total interference electric power of said demodulated signals as said communication state and judges that said communication state is worse than said predetermined state when said total interference electric power is larger than a predetermined threshold.

11. A base station as claimed in claim 6, wherein:
- said communication state monitor circuit, coupled to said signal-to-noise ratio determining circuits, monitors said signal-to-noise ratios as said communication state and judges that said communication state is worse than said predetermined state when the number of signal-to-noise ratios, each of which is smaller than a predetermined value, is equal to or larger than a predetermined threshold.

12. A base station as claimed in claim 6, wherein:
- said communication state monitor circuit, coupled to said transmission power control bit generators, monitors said transmission power control bit signals as said communication state and judges that said communication state is worse than said predetermine state when the number of said transmission power control bit signals, each of which require an increase of transmission power, is equal to or larger than a predetermined threshold.

13. A base station as claimed in claim 6, wherein:
- said communication state monitor circuit, coupled to said receivers, monitors total interference electric power of said demodulated signals and the number of said mobile terminals communicating with said base station as said communication state and judges that said communication state is worse than said predetermined state when a changing rate of a ratio of said total interference electric power to the number of said mobile terminals communicating with said base station is equal to larger than a predetermined threshold.

14. A transmission power control system for use in a base station of a mobile communication system, said base station including receivers for demodulating transmission signals transmitted from said mobile stations to produce demodulated signals, signal-to-noise ratio determining circuits coupled to said receivers, respectively, for determining signal-to-noise ratios of said demodulated signals and transmission power control bit generators connected to said signal-to-noise ratio determining circuits respectively for generating said transmission power control bit signals based on said signal-to-noise rations, said transmission power control system comprising:
- a communication state monitor circuit coupled to said receivers for monitoring a communication state of a group of individual communication between the mobile stations and the base station of said radio communication and detecting quality deterioration of the communication state of radio communication between said base station and said mobile stations; and
- a transmission power bit adjusting circuit coupled to said communication state monitor circuit and said transmission power control bit generators for controlling said transmission power control bit signals so as to suppress an increase of transmission power of said mobile stations when said communication state monitor circuit detects said quality deterioration.

15. A transmission power control system as claimed in claim 14, wherein:
- said transmission power control bit generators generate said transmission power control bit signals which require an increase of transmission power of said mobile stations when said signal-to-noise ratios are equal to or lower than a desired value; and
- said transmission power control bit adjusting circuit decreases said desired value to suppress an increase of transmission power of said mobile stations when said communication state monitor circuit detects said quality deterioration.

16. A transmission power control system as claimed in claim 14, wherein said transmission power control bit adjusting circuit changes said transmission power control bit signals so that said transmission power control bit signals require a decrease of said transmission power of said mobile stations.

17. A transmission power control system as claimed in claim 14, wherein said communication state monitor circuit comprises:
   a monitor unit for monitoring said communication state of said radio communication;
   a judging unit coupled to said monitor unit for judging whether said communication state monitored by said monitor unit is worse than a predetermined state; and
   a notifying unit coupled to said judging unit for notifying said transmission power control bit adjusting unit of said quality deterioration when said judging unit judges that said communication state is worse than said predetermined state.

18. A transmission power control system as claimed in claim 17, wherein:
   said monitor unit, coupled to said receivers, monitors total interference electric power of said demodulated signals as said communication state; and
   said judging unit judges that said communication state is worse than said predetermined state when said total interference electric power is equal to or larger than a predetermined threshold.

19. A transmission power control system as claimed in claim 17, wherein:
   said monitor, coupled to said signal-to-noise ratio determining circuits, monitors said signal-to-noise ratios as said communication state; and
   said judging unit judges that said communication state is worse than said predetermined state when the number of signal-to-noise ratios, each of which is smaller than a predetermined value, is equal to or larger than a predetermined threshold.

20. A transmission power control system as claimed in claim 17, wherein:
   said monitor unit, coupled to said transmission power control bit generators, monitors said transmission power control bit signals as said communication state; and
   said judging unit judges that said communication state is worse than said predetermine state when the number of said transmission power control bit signals, each of which require an increase of transmission power, is equal to or larger than a predetermined threshold.

21. A transmission power control system as claimed in claim 17, wherein:
   said monitor unit, coupled to said receivers, monitors total interference electric power of said demodulated signals and the number of said mobile terminals communicating with said base station as said communication state; and
   said judging unit judges that said communication state is worse than said predetermined state when a changing rate of a ratio of said total interference electric power to the number of said mobile terminals communicating with said base station is equal to or larger than a predetermined threshold.

22. A method of controlling transmission power of mobile stations from a base station of a mobile communication system, comprising:
   monitoring, at said base station, a communication state of a group of individual communication between the mobile stations and the base station of radio communication between said base station and said mobile stations;
   judging, at said base station, whether said monitored communication state is worse than a predetermined state; and
   notifying, in said base station, an external circuit of said quality deterioration when said communication state is judged to be worse than said predetermined state.

23. A method as claimed in claim 22, comprising demodulating transmission signals transmitted from said mobile stations to produce demodulated signals, wherein:
   total interference electric power of said demodulated signals is monitored as said communication state; and
   said communication state is judged to be worse than said predetermined state when said total interference electric power is equal to or larger than a predetermined threshold.

24. A method as claimed in claim 22, comprising demodulating transmission signals transmitted from said mobile stations to produce demodulated signals and determining signal-to-noise ratios of said demodulated signals, wherein:
   said monitoring periodically monitors an average of said signal-to-noise ratios as said communication state; and
   said communication state is judged to be worse than said predetermined state when the number of signal-to-noise ratios, each of which is smaller than a predetermined value, is equal to or larger than a predetermined threshold.

25. A method as claimed in claim 22, comprising demodulating transmission signals transmitted from said mobile stations to produce demodulated signals, determining signal-to-noise ratios of said demodulated signals and generating transmission power control bit signals on the basis of said signal-to-noise rations, wherein:
   said transmission power control bit signals are monitored as said communication state; and
   said communication state is judged to be worse than said predetermine state when the number of said transmission power control bit signals, each of which require increase of transmission power, is equal to or larger than a predetermined threshold.

26. A method as claimed in claim 22, comprising demodulating transmission signals transmitted from said mobile stations to produce demodulated signals, wherein:
   total interference electric power of said demodulated signals and the number of said mobile terminals communicating with said base station are monitored as said communication state; and
   said communication state is judged to be worse than said predetermined state when a changing rate of a ratio of said total interference electric power to the number of said mobile terminals communicating with said base station is equal to or larger than a predetermined threshold.

27. A method of controlling transmission power of mobile stations of a mobile communication system by use of transmission power control bit signals transmitted from a base station, comprising:
   demodulating transmission signals transmitted from said mobile stations to produce demodulated signals;
   determining signal-to-noise ratios of said demodulated signals;
   generating said transmission power control bit signals on the basis of said signal-to-noise rations;
   detecting, at said base station, quality deterioration of a communication state of a group of individual communication between the mobile stations and the base station of radio communication between said base station and said mobile stations; and
   controlling, at said base station, said transmission power control bit signals so as to suppress an increase of transmission power of said mobile stations when said quality deterioration is detected.

28. A method as claimed in claim 27, wherein said transmission power control bit signals, which require an increase of transmission power of said mobile stations, are generated when said signal-to-noise ratios are lower than a desired value, and said desired value is decreased to suppress an increase of transmission power of said mobile stations when said quality deterioration is detected.

29. A method as claimed in claim 27, wherein:

said transmission power control bit signals are changed so that said transmission power control bit signals require a decrease of said transmission power of said mobile stations.

30. A method as claimed in claim 27, wherein detecting comprises:

monitoring said communication state of said radio communication;

judging whether said monitored communication state is worse than a predetermined state; and notifying said quality deterioration when said communication state is judged to be worse than said predetermined state.

31. A method as claimed in claim 27, wherein:

total interference electric power of said demodulated signals is monitored as said communication state; and said communication state is judged to be worse than said predetermined state when said total interference electric power is equal to or larger than a predetermined threshold.

32. A method as claimed in claim 27, wherein:

said monitoring monitors each of said signal-to-noise ratios as said communication state; and said communication state is judged to be worse than said predetermined state when the number of signal-to-noise ratios, each of which is smaller than a predetermined value, is equal to or larger than a predetermined threshold.

33. A method as claimed in claim 27, wherein:

said transmission power control bit signals are monitored as said communication state; and said communication state is judged to be worse than said predetermined state when the number of said transmission power control bit signals, each of which require an increase of transmission power, is equal to larger than a predetermined threshold.

34. A method as claimed in claim 27, wherein:

total interference electric power of said demodulated signals and the number of said mobile terminals communicating with said base station are monitored as said communication state; and said communication state is judged to be worse than said predetermined state when a changing rate of a ratio of said total interference electric power to the number of said mobile terminals communicating with said base station is equal to or larger than a predetermined threshold.

35. A base station in a mobile communication system comprising:

a receiver which demodulates transmission signals transmitted from plural mobile stations;

a communication state monitor, coupled to said receiver, which monitors a communication state of a group of individual communication between the mobile stations and the base station and detects a deterioration of the communication state of radio communication between said base station and the plural mobile stations;

a transmission power control signal adjusting circuit, coupled to said communication state monitor, which controls transmission power control signals so as to decrease the transmission power of the plural mobile stations if said communication state monitor detects the deterioration; and a transmitter, coupled to said transmission power control signal adjusting circuit, which transmits the transmission power control signals to the plural mobile stations.

36. A base station according to claim 35, wherein, said communication state monitor monitors an interference power of the transmission signals received by said receiver, and detects the deterioration of the communication state based on the interference power.

37. A mobile station among plural mobile stations, in a mobile communication system, comprising:

a transmitter which transmits a signal to a base station;

a receiver which receives, from the base station, a transmission power control signal directing to decrease a power of the signal to be transmitted to the base station in the case where a deterioration of a communication state of a group of individual communication between the mobile stations and the base station of radio communication between the base station and the plural mobile stations is detected at the base station; and a transmission power controller which decides a transmission power of the signal to be transmitted to the base station based on the transmission power control signal.

38. A mobile station according to claim 37, wherein, the deterioration of the communication state is detected based on an interference power of transmission signals, from the plural mobile stations, received by the base station.

39. A mobile communication system comprising a base station and plural mobile stations, wherein said base station comprises:

a receiver which demodulates transmission signals transmitted from said plural mobile stations;

a communication state monitor, coupled to said receiver, which monitors a communication state of a group of individual communication between the mobile stations and the base station and detects a deterioration of the communication state of radio communication between said base station and said plural mobile stations;

a transmission power control signal adjusting circuit, coupled to said communication state monitor, which controls transmission power control signals so as to decrease the transmission power of said plural mobile stations if said communication state monitor detects the deterioration; and a transmitter, coupled to said transmission power control signal adjusting circuit, which transmits the transmission power control signals to the plural mobile stations, and each of said mobile stations comprises:

a transmitter which transmits a signal to said base station;

a receiver which receives one of the transmission power control signals from the base station; and a transmission power controller which decides a transmission power of the signal to be transmitted to said base station based on the transmission power control signal received by said receiver.

40. A method, for a mobile communication system comprising a base station and plural mobile stations, comprising:

demodulating transmission signals transmitted from the plural mobile stations;

detecting, at the base station, a deterioration of a communication state of a group of individual communication between the mobile stations and the base station of radio communication between said base station and the plural mobile stations;

controlling, at the base station, power control signals so as to decrease the transmission power of the plural mobile stations if a communication state monitor detects the deterioration; and transmitting the transmission power control signals to the plural mobile stations.

41. A method, for a mobile communication system comprising a base station and plural mobile stations, comprising:

transmitting a signal to the base station;

receiving, from the base station, a transmission power control signal directing to decrease a power of the signal to be transmitted to the base station in the case where a deterioration of a communication state of a group of individual communication between the mobile stations and the base station of radio communication between the base station and the plural mobile stations is detected at the base station; and deciding a transmission power of the signal to be transmitted to the base station based on the transmission power control signal.

42. A method for a mobile communication system, comprising a base station and plural mobile stations, comprising:

demodulating transmission signals transmitted from the plural mobile stations;

detecting, at the base station, a deterioration of a communication state of a group of individual communication between the mobile stations and the base station of radio communication between said base station and the plural mobile stations;

controlling, at the base station, transmission power control signals so as to decrease the transmission power of the plural mobile stations if said communication state monitor detects the deterioration;

transmitting the transmission power control signals to the plural mobile stations;

transmitting a signal to the base station;

receiving one of the transmission power control signals form the base station; and deciding a transmission power of the signal to be transmitted to the base station based on the transmission power control signal received.

* * * * *